(12) United States Patent
Narasimhan et al.

(10) Patent No.: US 7,781,741 B2
(45) Date of Patent: Aug. 24, 2010

(54) METHODS AND SYSTEMS FOR CONTROLLING DATA ACQUISITION SYSTEM NOISE

(75) Inventors: Swaminathan Narasimhan, Oconomowoc, WI (US); Koji Bessho, Tokyo (JP)

(73) Assignee: General Electric Company, Schenectady, NY (US)

( * ) Notice: Subject to any disclaimer, the term of this patent is extended or adjusted under 35 U.S.C. 154(b) by 173 days.

(21) Appl. No.: 11/260,819

(22) Filed: Oct. 27, 2005

(65) Prior Publication Data

US 2007/0096029 A1    May 3, 2007

(51) Int. Cl.
*G01T 1/00* (2006.01)
(52) U.S. Cl. .................................. 250/394; 250/395
(58) Field of Classification Search ................ 250/369, 250/394, 395
See application file for complete search history.

(56) References Cited

U.S. PATENT DOCUMENTS

| | | | |
|---|---|---|---|
| 3,937,066 A | 2/1976 | Green et al. | |
| 4,310,907 A | 1/1982 | Tachita et al. | |
| 4,617,730 A | 10/1986 | Geldermans et al. | |
| 4,653,000 A | 3/1987 | Matsumoto | |
| 4,783,695 A | 11/1988 | Eichelberger et al. | |
| 4,933,042 A | 6/1990 | Eichelberger et al. | |
| 5,248,885 A * | 9/1993 | Sato et al. ............... | 250/370.15 |
| 6,242,282 B1 | 6/2001 | Fillion et al. | |
| 6,472,668 B1 * | 10/2002 | Griesmer et al. ....... | 250/370.13 |
| 6,489,904 B1 | 12/2002 | Hisano | |
| 6,756,993 B2 | 6/2004 | Popescu et al. | |
| 6,867,870 B1 * | 3/2005 | Mihaylov et al. ........... | 356/601 |
| 6,940,141 B2 | 9/2005 | Kinsman | |
| 7,062,008 B2 * | 6/2006 | Joshi et al. .................... | 378/19 |
| 7,289,336 B2 | 10/2007 | Burdick, Jr. et al. | |
| 2005/0067579 A1 * | 3/2005 | Tsuchiya et al. ....... | 250/370.15 |

* cited by examiner

*Primary Examiner*—David P Porta
*Assistant Examiner*—Carolyn Igyarto
(74) *Attorney, Agent, or Firm*—Armstrong Teasdale LLP (57) ABSTRACT

Methods and systems for an imaging system including a detector and a data acquisition system are provided. The data acquisition system includes a plurality of terminations, at least one of the terminations coupled to a signal lead of a respective detector element, the circuit board connector positioned proximate the detector to facilitate reducing an input capacitance of the respective detector element signal leads, and at least one connector slot configured to receive a single analog to digital converter board (A/D board), the connector slot further configured to receive two A/D boards in a back-to-back configuration with respect to each other.

17 Claims, 5 Drawing Sheets

METHODS AND SYSTEMS FOR CONTROLLING DATA ACQUISITION SYSTEM NOISE

BACKGROUND OF THE INVENTION

This invention relates generally to imaging and, more particularly, to a tileable data acquisition system architecture for a multislice imaging system.

In at least some imaging systems, generally referred to as computed tomography (CT) systems, an x-ray source projects a fan-shaped beam which is collimated to lie within an X-Y plane of a Cartesian coordinate system and generally referred to as the "imaging plane". The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged so that the angle at which the x-ray beam intersects the object constantly changes. X-ray sources typically include x-ray tubes, which emit the x-ray beam at a focal spot. X-ray detectors typically include a collimator for collimating x-ray beams received at the detector, a scintillator adjacent the collimator, and photodiodes adjacent the scintillator.

The detector typically is coupled to a data acquisition system (DAS) which converts the analog signals output by the detector into a digital form. The conversion of the analog signals to a digital form may be performed by an analog-to-digital converter located in an encapsulated integrated circuit (IC) chip on a printed circuit board. Typically, the circuit board is coupled to a connector connected to a backplane of an enclosure with a plurality of other similar circuit boards. The connectors are coupled to the detector through cables. Such a configuration locates the analog-to-digital converter circuit board relatively far from the detector. This results in long interconnect lines between the analog-to-digital converter circuit board and detector and a relatively higher noise performance than would be possible if the analog-to-digital converters were located in close proximity to the detector. Using an encapsulated IC to house the analog-to-digital converters prevents a close density configuration that facilitates minimizing the path length from the detector to the analog-to-digital converters.

BRIEF DESCRIPTION OF THE INVENTION

In one embodiment, a data acquisition system for an imaging system including a detector is provided. The data acquisition system includes a circuit board connector that includes a plurality of terminations, at least one of the terminations is coupled to a signal lead of a respective detector element wherein the circuit board connector is positioned proximate the detector to facilitate reducing an input capacitance of the respective detector element signal leads, and at least one connector slot configured to receive a single analog to digital converter board (A/D board), the connector slot further configured to receive two A/D boards in a back-to-back configuration with respect to each other.

In another embodiment, an imaging system is provided. The imaging system includes a detector having a plurality of detector elements, each element is electrically coupled to an input of a data acquisition system (DAS) for acquiring image data wherein the DAS includes a circuit board connector including a plurality of terminations, at least one of the terminations coupled to a signal lead of a respective detector element, the circuit board connector positioned proximate the detector to facilitate reducing an input capacitance of the signal lead, the circuit board connector further including a connector slot configured to receive a single analog to digital converter board (A/D board), the connector slot further configured to receive two A/D boards in a back-to-back configuration with respect to each other, and at least one analog to digital converter board (A/D board) communicatively coupled to the connector slot.

In yet another embodiment, a method of assembling an imaging system is provided. The imaging system includes a detector having a plurality of detector elements electrically coupled to an input of a data acquisition system (DAS) for acquiring image data. The method includes coupling a circuit board connector to the plurality of detector elements using a signal lead of a respective detector element from each detector element to an associated circuit board connector termination wherein the circuit board connector is positioned proximate the plurality of detector elements to facilitate reducing an input capacitance of the detector element signal leads. The method also includes coupling at least one analog to digital converter board (A/D board) to the circuit board connector, the circuit board connector including a slot configured to receive a single A/D board and configured to receive two A/D boards in a back-to-back orientation with respect to each other.

DETAILED DESCRIPTION OF THE INVENTION

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Also as used herein, the phrase "reconstructing an image" is not intended to exclude embodiments of the present invention in which data representing an image is generated but a viewable image is not. Therefore, as used herein the term, "image," broadly refers to both viewable images and data representing a viewable image. However, many embodiments generate (or are configured to generate) at least one viewable image.

Figure 1:
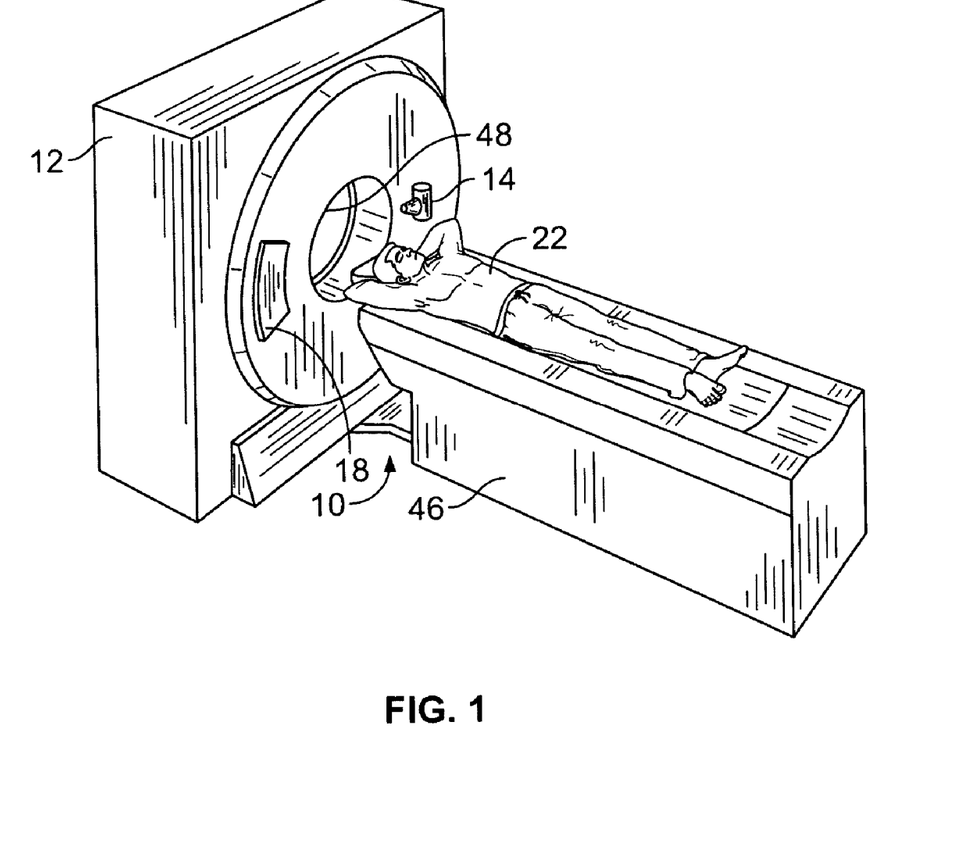
FIG. 1 is a pictorial view of a multi slice volumetric CT imaging system.
Figure 2:
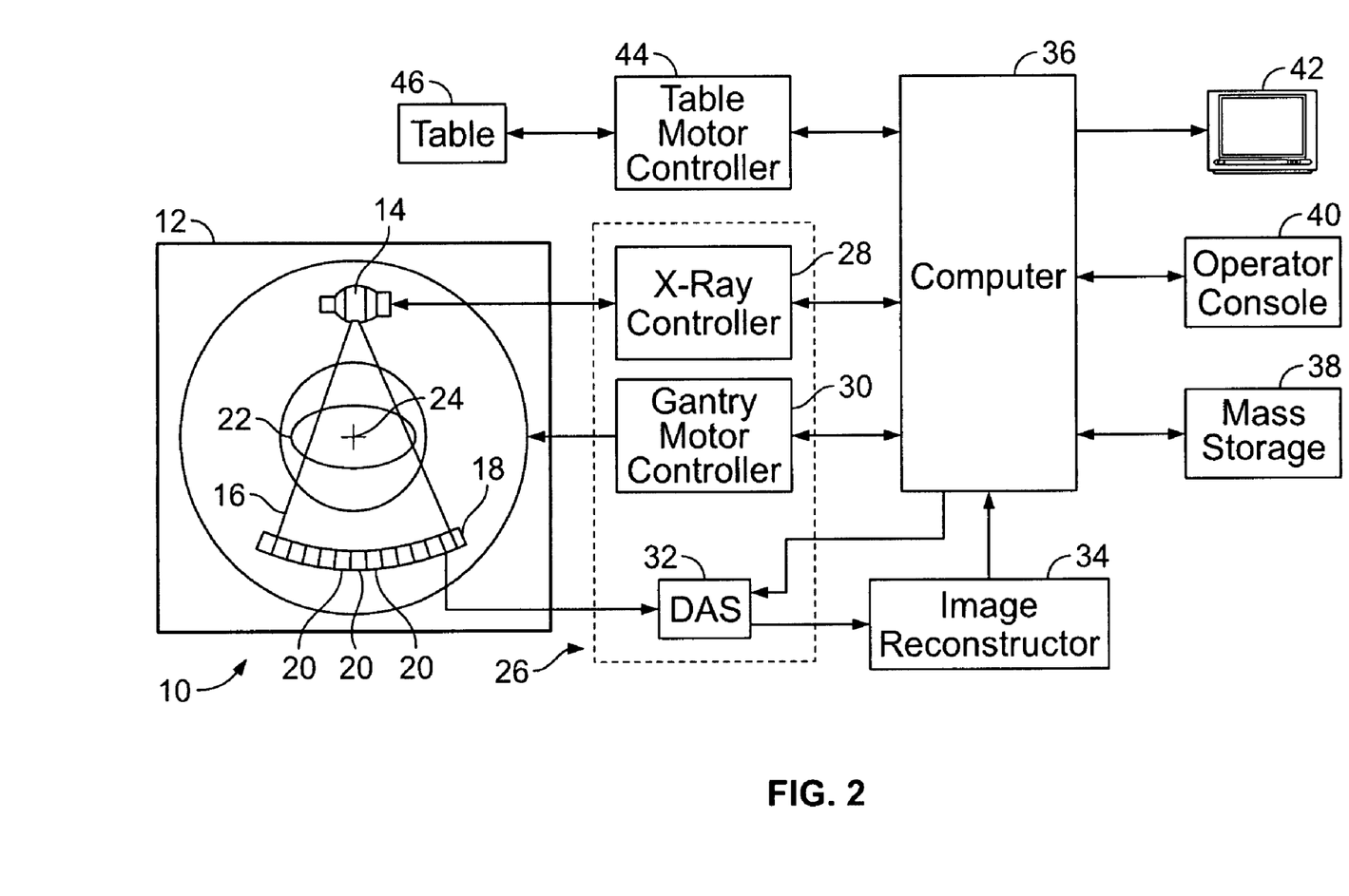
FIG. 2 is a block schematic diagram of the multi slice volumetric CT imaging system illustrated in FIG. 1.

FIG. 1 is a pictorial view of a multi slice volumetric CT imaging system 10. FIG. 2 is a block schematic diagram of system 10 illustrated in FIG. 1. In the exemplary embodiment, a computed tomography (CT) imaging system 10, is shown as including a gantry 12 representative of a "third generation" CT imaging system. Gantry 12 has a radiation source 14 that projects a cone beam 16 of x-rays toward a detector array 18 on the opposite side of gantry 12.

Detector array 18 is formed by a plurality of detector rows (not shown) including a plurality of detector elements 20, which together sense the projected x-ray beams that pass through an object, such as a medical patient 22. Each detector element 20 produces an electrical signal that represents the intensity of an impinging radiation beam and hence the attenuation of the beam as it passes through patient 22. An imaging system 10 having a multislice detector array 18 is capable of providing a plurality of images representative of patient 22. Each image of the plurality of images corresponds to a separate "slice" of the volume. The "thickness" or aperture of the slice is dependent upon the thickness of the detector rows.

During a scan to acquire radiation projection data, gantry 12 and the components mounted thereon rotate about an axis of rotation 24. FIG. 2 shows only a single row of detector elements 20 (i.e., a detector row). However, multislice detector array 18 includes a plurality of parallel detector rows of detector elements 20 such that projection data corresponding to a plurality of quasi-parallel or parallel slices can be acquired simultaneously during a scan.

Rotation of gantry 12 and the operation of radiation source 14 are governed by a control mechanism 26 of CT system 10. Control mechanism 26 includes a radiation controller 28 that provides power and timing signals to radiation source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstruct or 34 receives sampled and digitized radiation data from DAS 32 and performs high-speed image reconstruction. The reconstructed image is applied as an input to a computer 36, which stores the image in a mass storage device 38.

Computer 36 also receives commands and scanning parameters from an operator via console 40 that has a keyboard. An associated display 42 allows the operator to observe the reconstructed image and other data from computer 36. The operator supplied commands and parameters are used by computer 36 to provide control signals and information to DAS 32, radiation controller 28, and gantry motor controller 30. In addition, computer 36 operates a table motor controller 44 that controls a motorized table 46 to position patient 22 in gantry 12. Particularly, table 46 moves portions of patient 22 through gantry opening 48.

In one embodiment, computer 36 includes a device, for example, a floppy disk drive or CD-ROM drive, for reading instructions and/or data from a computer-readable medium, such as a floppy disk or CD-ROM. In another embodiment, computer 36 executes instructions stored in firmware (not shown). Generally, a processor in at least one of DAS 32, reconstruct or 34, and computer 36 shown in FIG. 2 is programmed to execute the processes described below. Of course, the method is not limited to practice in CT system 10 and can be utilized in connection with many other types and variations of imaging systems. In one embodiment, computer 36 is programmed to perform functions described herein, accordingly, as used herein, the term computer is not limited to just those integrated circuits referred to in the art as computers, but broadly refers to computers, processors, microcontrollers, microcomputers, programmable logic controllers, application specific integrated circuits, and other programmable circuits.

Set forth below is a description of an exemplary multislice CT system in accordance with one embodiment of the present invention. Although one embodiment of the system is described in detail below, it should be understood that many alternative embodiments of the inventions are possible. For example, although one particular detector and one particular data acquisition system are described, other detectors or data acquisition systems could be used in connection with the system, and the present invention is not limited to practice with any one particular type of detector. Specifically, the detector described below includes a plurality of modules and each module includes a plurality of detector cells. Rather than the specific detector described below, a detector which has non-segmented cells along the z-axis, and/or a detector which has multiple modules with multiple elements along the x-axis and/or z-axis joined together in either direction to acquire multislice scan data simultaneously, can be utilized. Generally, the system is operable in a multislice mode to collect one or more slices of data. Axial and helical scans can be performed with the system, and cross section images of a scanned object can be processed, reconstructed, displayed, and/or archived.

Figure 3:
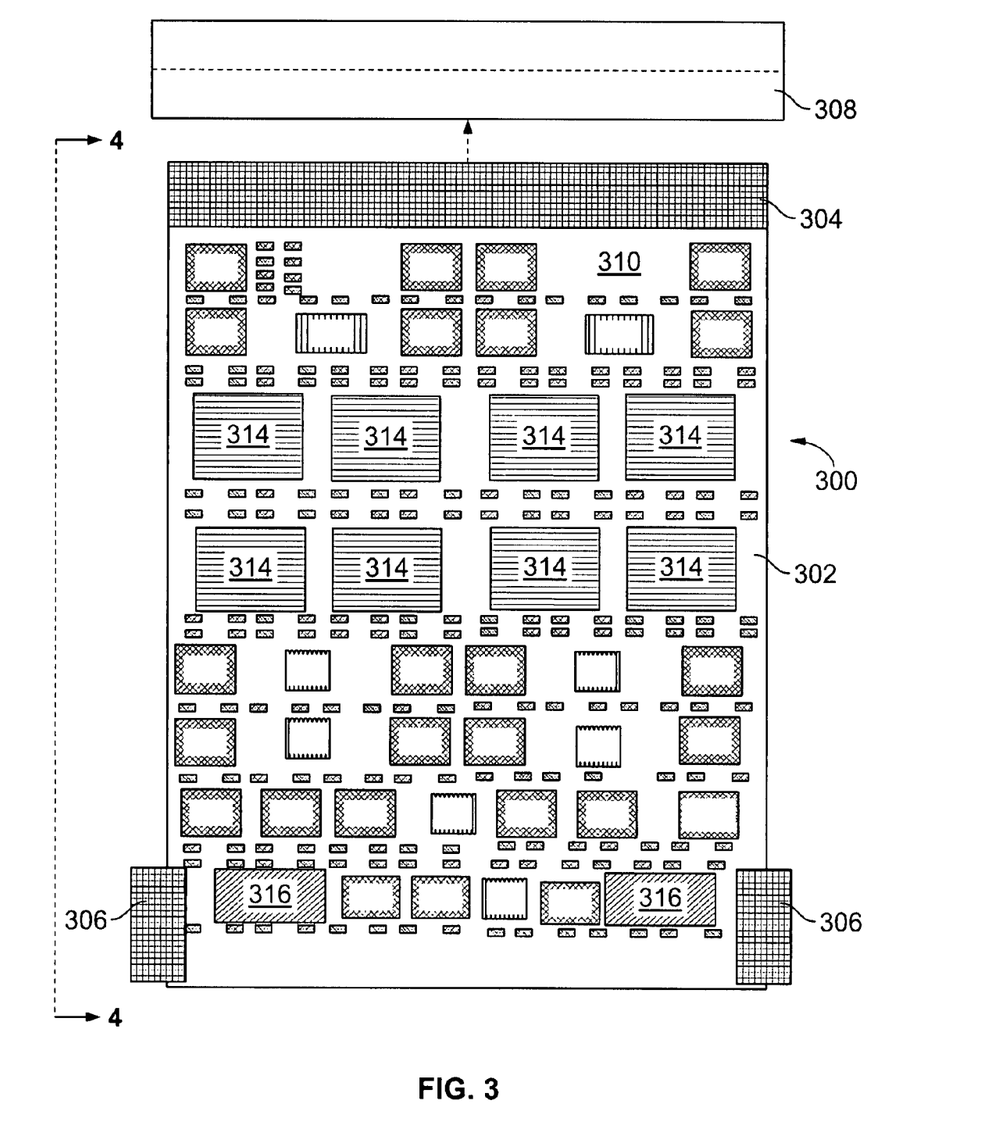
FIG. 3 is a plan view of an exemplary analog-to-digital converter board (A/D board) that may be used with the DAS shown in FIG. 2.

FIG. 3 is a plan view of an exemplary analog-to-digital converter board (A/D board) 300 that may be used with DAS 32 (shown in FIG. 2).

In the exemplary embodiment, DAS 32 includes an Interface Board (IFB) (not shown), which provides electrical power at various voltages and interconnection to components located external to DAS 32, a DAS Control Board (DCB) (not shown), which controls the DAS data scan protocols and the control signals for data acquisition, and A/D board 300, which converts the low level analog signals from the detector elements 20 into digital words for communication with other portions of system 10.

A/D board 300 includes a circuit board substrate 302, at least one analog input connector 304, and at least one output connector 306. A connector 308 is configured to couple to a plurality of leads (not shown) extending from detector elements 20 (not shown in FIG. 3). Connector 308 is configured to receive a plurality of A/D boards 300. In the exemplary embodiment, connector 308 is configured to receive two A/D boards 300 is a back-to-back orientation. Circuit board substrate 302 includes a front side 310, for example, a side on which substantially all circuit board components are mounted, and a back side (not visible in FIG. 3), for example, the side on which relatively few components are mounted.

A/D board 300 includes a plurality of components mounted to front side 310. The components may include one or more application specific integrated circuits (ASIC) 314. In the exemplary embodiment, ASICs 314 include, for example, sixty-four analog-to-digital converters, such that A/D board 300, with eight ASICs 314 onboard may accommodate 512 connections to detector elements 20. Such a density of signals may be achieved by packaging ASICs 314 in a Chip Scale Package (CSP). A CSP may include a single-die, direct surface mountable package with an area of no more than 1.2 times the original die area giving ASIC 314 a smaller size, such as a reduced footprint and a reduced thickness compared to traditional packaging techniques, lesser weight, relatively easier assembly process, lower over-all production costs, and improvement in electrical performance. CSP design is also tolerant of die size changes, since a reduced die size can still be accommodated by the interposer design without changing the CSP's footprint. The CSP design results in a small footprint for ASICs 314, enabling a layout of A/D board 300 with no significant differences in trace length between different diode pixels and a respective analog-to-digital converter, resulting in similar noise performance from pixel-to-pixel and a lower noise performance of ASICs 314 due to shorter lead lengths inside the package. A smaller footprint of ASICs 314 also enables expandability in the Z direction by adding more ASICs 314 as the length of detector 18 increases in the Z direction. Additionally, relatively short path lengths to ASICs 314 facilitate minimizing the input capacitance which results in lower noise floor for the same signal level.

In the exemplary embodiment, ASICs 314 include analog-to-digital converters configured to receive an analog input from detector elements 20 and transmit a digital signal representative of one or more parameters of the input signal. A feature of ASICs 314 and A/D board 300 is that it is "tileable". As used herein, the term "tileable" means that ASICs 314 may be combined with other ASICs 314 to form a larger effective ASIC 314. For example, a Field of View of system 10 may be extended in a Z-direction by adding detector elements 20 to detector array 18 and adding ASICs 314 to A/D board 300. The design of A/D board 300 is symmetrical such that existing portion of A/D board 300 is not disturbed when adding additional ASICs 314. It should be well understood that any number of ASICs 314 may be added to form an A/D board 300 that can accommodate the additional detector elements 20. A digital output from the analog-to-digital converters may be transmitted either in a serial or semi-serial fashion to reduce the amount of interconnecting hardware using, for example, a line driver 316, such as a low voltage 16-bit bidirectional transceiver. A high-speed serial connection facilitates minimizing a number of connections between DAS 32 and other components of system 10, such as one or more DSP modules, to provide a simple and more reliable design.

In operation, detector array 18 is excited by incident X-rays and emits a relatively low electric current signal that is typically in the nA to pA range and is dependent on the kV of the incident X-rays and the anatomy being imaged. Analog current signals from detector array 18 are supplied to input channels of A/D board 300 via shielded ribbon or flex cables. A/D boards 300 are positioned in close proximity to detector array 18 because the quality of images generated in system 10 dependent at least partially on a quality of the acquisitions and a conversion the low level analog signals into digital signals. The cables are directly coupled to terminal connectors on connector 308 rather than an intermediate backplane. Elimination of the analog backplane permits replacement of a modular component, such as a combination Diode-DAS module, providing ease of field serviceability. One or more A/D boards 300 may he plugged into connector 308. In the exemplary embodiment, connector 308 is configured to accept a pair of A/D boards 300 such that the path length of the conductors from each element 20 to respective ASICs 314 is facilitated being minimized. A shorter conductor path length facilitates reducing the capacitance of the conductors, which reduces the input noise of the conductor.

Figure 4:
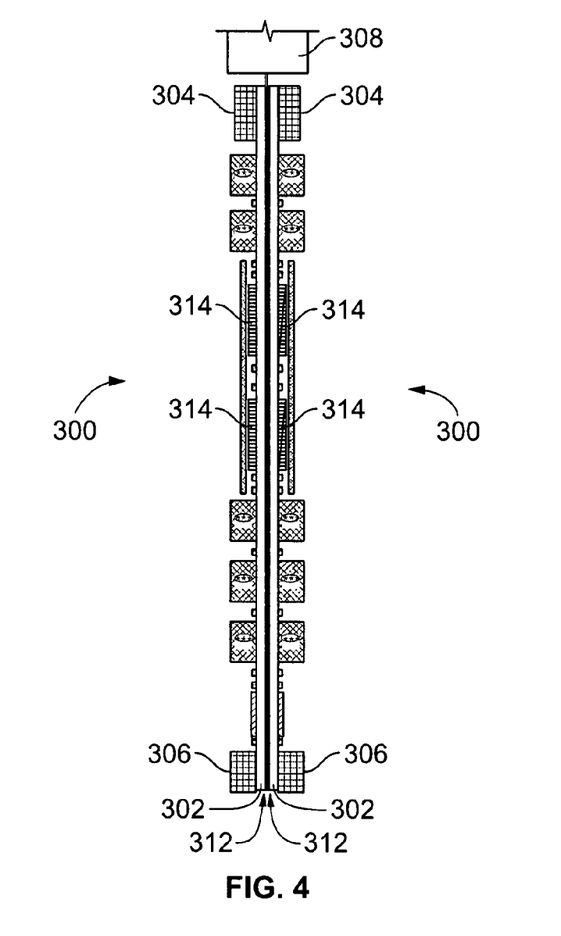
FIG. 4 is a side view of a pair of exemplary A/D boards shown in FIG. 3.

FIG. 4 is a side view of a pair of exemplary A/D boards 300 (shown in FIG. 3) taken along a view "4". In the exemplary embodiment, the A/D boards 300 are coupled to connector 308 in a back-to-back orientation. As used herein, back-to-back, describes an orientation wherein a back side 312 of each A/D board 300 is facing back side 312 of the other A/D board 300 positioned in the same connector 308. Each A/D board 300 is configured to receive 512 (64×8) low signal analog connections. The pair of boards, coupled to connector 308, therefore, provides up to 1024 (512×2) low signal analog connections. In various other embodiments, due to the expandable structure of A/D board 300, more low signal analog connections may be available based on a number of ASICs 314 used on each A/D board 300 and a number of analog-to-digital converters located on each ASIC 314.

Figure 5:
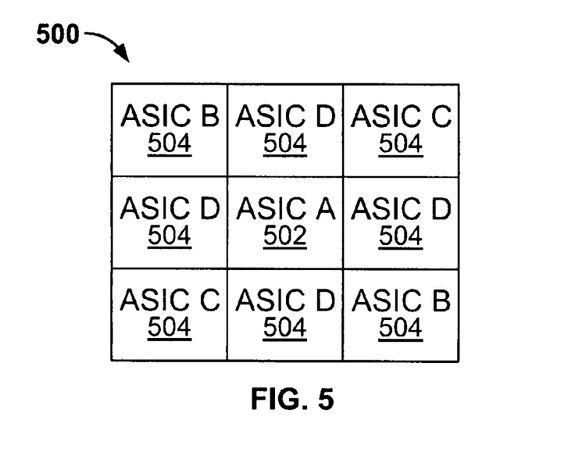
FIG. 5 is a schematic plan view of a portion of the detector array shown in FIG. 2 that may be used with the multi slice volumetric CT imaging system.

FIG. 5 is a schematic plan view of a portion 500 of detector elements that may he used with system 10 (shown in FIG. 2). Portion 500 includes a first detector element 502 that corresponds to a pixel and eight detector elements 504 that surround first detector element 502. In the exemplary embodiment, first detector element 502 is coupled to an analog-to-digital converter located in an ASIC designated "ASIC A". Each of the other detector elements surrounding first detector element 502 are coupled to ASICs other than ASIC A. The signal traces on A/D board 300 are routed such that no pixels surrounding a pixel are connected to the same ASIC as the surrounded pixel. Such a configuration permits dithering when first detector clement 502 fails. The information from the surrounding pixels may be extrapolated to correct for a failed pixel.

Figure 6:
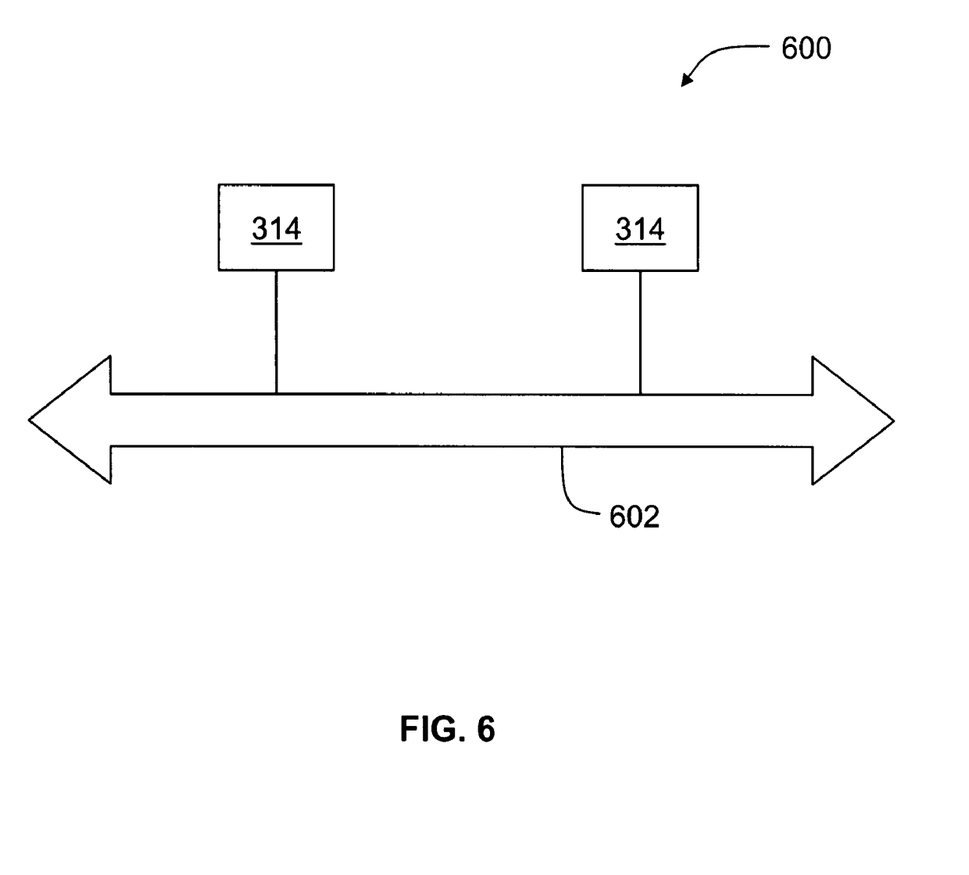
FIG. 6 is a block diagram of an embodiment of a system for controlling data acquisition system noise.

FIG. 6 is a block diagram of an embodiment of a system 600 for controlling data acquisition system noise. System 600 includes a serial data transmission bus 602 connected to ASICs 314. In another embodiment, system 600 is connected to any number of ASICs 314.

Although the embodiments described herein are discussed with respect to medical imaging, it is understood that the image acquisition and processing methodology described herein is not limited to medical applications, but may be utilized in non-medical applications.

The description of the above embodiments is merely illustrative. As described above, embodiments in the form of computer-implemented processes and apparatuses for practicing those processes may be included. Also included may be embodiments in the form of computer program code containing instructions embodied in tangible data storage device 38, such as floppy diskettes, CD-ROMs, hard drives, or any other computer-readable storage medium, wherein, when the computer program code is loaded into and executed by a computer, the computer becomes an apparatus for practicing the invention. Also included may be embodiments in the form of computer program code, for example, whether stored in a storage medium, loaded into and/or executed by a computer, or as a propagated data signal transmitted, whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be appreciated that the use of first and second or other similar nomenclature for denoting similar items is not intended to specify or imply any particular order unless otherwise stated.

The above-described embodiments of an imaging system provide a cost-effective and reliable means for a data acquisition system that provides a more compact design resulting in closer packaging of the DAS-Detector subsystem. More specifically, a lead length of conductors between the detector elements and the analog-to-digital converters improves the system noise performance, a tileable architecture provides easy expandability in the Z direction, a chip scale packaging design enables a smaller footprint of the ASIC package, and dithering in the A/D board enables extrapolation of the data of a failed ASIC channel. As a result, the described methods facilitate maintenance and operation of the data acquisition system in a cost-effective and reliable manner.

Exemplary embodiments of imaging system methods and apparatus are described above in detail. The imaging system components illustrated are not limited to the specific embodiments described herein, but rather, components of each imaging system may be utilized independently and separately from other components described herein. For example, the imaging system components described above may also be used in combination with different imaging systems. A technical effect of the various embodiments of the systems and methods described herein include facilitating image quality through minimizing data acquisition system noise, and routing signals to enable dithering of the data.

While the invention has been described in terms of various specific embodiments, those skilled in the art will recognize that the invention can be practiced with modification within the spirit and scope of the claims.

What is claimed is:

1. A data acquisition system for an imaging system including a detector having a plurality of detector elements, said data acquisition system comprising:
   a plurality of terminations, at least one of said terminations configured to be coupled to a signal lead of a respective one of the detector elements;
   a first A/D board comprising at least one lead and a plurality of tileable Application Specific Integrated Circuit (ASIC) chips;
   a second A/D board comprising at least one lead and a plurality of tileable ASIC chips;
   a single connector slot configured to receive said at least one lead of said first A/D board and said at least one lead of said second A/D board such that said first A/D board and said second A/D board are seated against one another in a back-to-back configuration; and
   wherein the detector elements include a plurality of adjacent detector elements, each adjacent detector element configured to be coupled to a different one of said ASIC chips.

2. A data acquisition system in accordance with claim 1 wherein said ASIC chips are configured to be oriented symmetrically with respect to said terminations.

3. A data acquisition system in accordance with claim 2 wherein at least one of said ASIC chips comprises a chip scale packaging design, and
   said analog-to-digital converters coupled to said terminations via signal traces routed to facilitate a substantially equal path length between the detector elements and said analog-to-digital converters.

4. A data acquisition system in accordance with claim 3 wherein said data acquisition system is expandable in a Z-direction by coupling at least one additional ASIC chip to at least one of said first and second A/D boards.

5. A data acquisition system in accordance with claim 1 further comprising a serial data transmission bus and at least one of said ASIC chips coupled to said serial data transmission bus.

6. A data acquisition system in accordance with claim 1 wherein a path length from each of the detector elements to a respective one of said ASIC chips is configured to be substantially equal.

7. An imaging system comprising:
   a detector comprising a plurality of detector elements, wherein each detector element comprises a signal lead;
   a data acquisition system (DAS) for acquiring image data, said DAS comprising
      a first analog-to-digital converter (A/D) board comprising a plurality of tileable Application Specific Integrated Circuit (ASIC) chips,
      a second A/D board comprising a plurality of tileable ASIC chips,
      an input, and
      a circuit board connector comprising a plurality of terminations;
   wherein each of said detector elements is electrically coupled to said input;
   wherein at least one of said terminations is coupled to said signal lead;
   said circuit board connector further comprising a single connector slot configured to receive said first A/D board and said second A/D board such that said first A/D board and said second A/D board are seated against one another in a back-to-back configuration with at least one of said first and second A/D boards communicatively coupled to said connector slot; and
   wherein each of said detector elements is adjacent another detector element of said detector elements, and each of said detector elements is coupled to a respective one of said ASIC chips such that adjacent detector elements are coupled to different ASIC chips.

8. An imaging system in accordance with claim 7 wherein said terminations are configured for receiving inputs from said detector.

9. An imaging system in accordance with claim 7 wherein at least one of said ASIC chips comprises a chip scale packaging design.

10. An imaging system in accordance with claim 9 wherein said DAS is expandable in a Z-direction by coupling at least one additional ASIC to at least one of said first and second A/D boards.

11. An imaging system in accordance with claim 9 further comprising a serial data transmission bus, each of said ASIC chips coupled to said serial data transmission bus.

12. An imaging system in accordance with claim 9 wherein a path length from each of said detector elements to a respective one of said ASIC chips is substantially equal.

13. A method of assembling an imaging system, the imaging system including a detector having a plurality of detector elements electrically coupled to an input of a data acquisition system (DAS) for acquiring image data, said method comprising:
   coupling a circuit board connector to the plurality of detector elements using a signal lead from each detector element to an associated circuit board connector termination;
   receiving at least one lead of a first analog-to-digital converter (A/D) board including a plurality of tileable Application Specific Integrated Circuit (ASIC) chips and at least one lead of a second A/D board including a plurality of tileable ASIC chips within a single slot of the circuit board connector such that the first A/D board and the second A/D board are seated against one another in a back-to-back configuration;
   wherein each detector element of the plurality of detector elements is surrounded by adjacent detector elements of the plurality of detector elements, and
   coupling each of the adjacent detector elements to a different one of the ASIC chips.

14. A method in accordance with claim 13 wherein each of the ASIC chips includes a plurality of analog-to-digital converters, at least one of the ASIC chips including a chip scale packaging design.

15. A method in accordance with claim 13 further comprising:
coupling a plurality of additional detector elements to the detector in a Z-direction for expanding an imaging field of view of the system in the Z-direction; and
coupling a plurality of additional ASIC chips to at least one of the first A/D board and the second A/D board such that an analog-to-digital converter input is communicatively coupled to the plurality of additional detector elements.

16. A method in accordance with claim 13 wherein at least one of the first A/D board and the second A/D board includes a serial data transmission bus, said method further comprising coupling at least one of the ASIC chips to the serial data transmission bus.

17. A method in accordance with claim 13 further comprising coupling the plurality of detector elements to at least one of the first A/D board and the second A/D board such that a path length from each of the plurality of detector elements to the at least one of the first A/D board and the second A/D board is substantially equal.

* * * * *